United States Patent [19]
Hoffman et al.

[11] 4,140,839
[45] Feb. 20, 1979

[54] TUBELET POCKET

[75] Inventors: Harald Hoffman, Mannheim; Dietmar Appel, Troisdorf-Sieglar, both of Fed. Rep. of Germany

[73] Assignees: Carl Freudenberg, Weinheim; Gottfried Hagen AG, Cologne-Kalk, both of Fed. Rep. of Germany

[21] Appl. No.: 904,669

[22] Filed: May 10, 1978

Related U.S. Application Data

[63] Continuation of Ser. No. 779,960, Mar. 22, 1977, abandoned.

[30] Foreign Application Priority Data

Mar. 26, 1976 [DE] Fed. Rep. of Germany ....... 2612863

[51] Int. Cl.² .............................................. H01M 2/18
[52] U.S. Cl. ...................... 429/140; 428/36; 428/188

[58] Field of Search ................. 429/140, 141; 428/36, 428/188, 398; 156/296, 166

[56] References Cited

U.S. PATENT DOCUMENTS

| | | | |
|---|---|---|---|
| 2,905,738 | 9/1959 | Pasquale et al. | 429/140 X |
| 2,972,000 | 2/1961 | Borilo | 429/140 |
| 3,265,535 | 8/1966 | Sundberg | 429/141 |
| 3,972,728 | 8/1976 | Sundberg et al. | 429/141 |

Primary Examiner—Charles F. Lefevour
Attorney, Agent, or Firm—Sprung, Felfe, Horn, Lynch & Kramer

[57] ABSTRACT

A tubelet pocket construction for holding the positive electrodes of accumulators and a method for making same comprises two pieces of a textile sheet material which are connected together by parallel longitudinal seams which define a plurality of parallel tubelets. The textile sheet material comprises an electrolyte-resistant nonwoven fabric which is reinforced by a woven or laid fabric of electrolyte-resistant fibers.

8 Claims, 2 Drawing Figures

TUBELET POCKET

This is a continuation, of application Ser. No. 779,960, filed Mar. 22, 1977 now abandoned.

BACKGROUND OF THE INVENTION

The invention relates to a pocket for the positive electrodes of lead accumulators or batteries, consisting of two pieces of a textile sheet material, which are held together by parallel seams dividing the pocket into parallelly disposed tubelets.

The positive plates of lead accumulators are today commonly formed of a plurality of bars disposed adjacent one another. These are surrounded by tubelets of a textile material of such a nature that the required active composition can be filled into the intervals between the bar and the individual tubelet.

Since the active composition changes its volume with the state of charge of the accumulator, the mechanical strength of the tubelets must be very great.

It is known to use such tubelets drawn on individually or in the form of tubelet pockets. The latter have the advantage of easier manufacture and assembly.

German Utility Model No. 74 25 570 describes a tubelet pocket which is made of a nonwoven fabric. Such pockets have the advantage that the individual fibers are in random arrangement and thus form a kind of labyrinth which is outstandingly effective as a filter for solid particles of the active composition, but which on the other hand offers no appreciable resistance to the passage of ions. The use of tubelet pockets of nonwoven fabric consequently results in a very low internal resistance in the battery, which is desirable. Such nonwoven pockets are relatively elastic, i.e., they adapt themselves to a great extent to the volume of the active composition as it continuously varies in operation. For example, nonwoven tubelets withstand the pressure occurring under extreme brief stresses when tubelets of necessarily less elastic woven fabrics burst. The elasticity of the nonwoven tubelet pocket also enables the confined active composition to remain always relatively loose, and this provides for a good capacity in the cells by allowing the particles to present a large surface area in a desirable manner. However, it can be considered a disadvantage of such pockets that the known nonwoven tubelets, under certain circumstances, are not capable of withstanding in the long run the mechanical stress produced by the constant swelling and shrinking of the active composition in the tubelets in the charging and discharging processes.

A loosening of the bond between the fibers ultimately leads to a high permanent expansion, with the danger of premature failure of the cell due to sedimentation.

On account of this danger inherent in tubelet pockets of nonwoven materials, tubelet pockets made of woven fabrics have become known. The disadvantage must, of course, be accepted that such pockets have a poorer filtering action than nonwoven materials, and that the internal resistance of batteries equipped in this manner is comparatively high.

SUMMARY OF THE INVENTION

The invention is addressed to the problem of developing a tubelet pocket which combines the advantages of both systems without entailing their disadvantages.

This problem is solved in accordance with the present invention by a tubelet pocket for the positive electrodes of lead accumulators, consisting of two pieces of a textile sheet material which are held together by parallel seams whereby the pocket is divided into tubelets disposed parallel to one another, characterized in that the textile sheet material consists of an electrolyte-resistant non-woven fabric which is reinforced by a woven or laid fabric of electrolyte-resistant fibers.

Preferably the woven or laid fabric consists of monofil threads, the count of the warp threads being in a ratio to the filling threads of from 1 : 1 to 1 : 100, preferably of from 1 : 1 to 1 : 20. In a special embodiment, provision is made for using as the reinforcement only those threads which run perpendicularly to the length of the tubelets.

The threads are disposed regularly at a distance from one another corresponding to a count of 0.5 to 5 threads per centimeter, preferably 1 to 3 threads per centimeter. According to a further embodiment, provision is furthermore made for joining a woven or laid fabric of this kind to the textile sheet material such that the latter, under a load of 200 N per 5 centimeters of strip width, will have a permanent elongation of between 1 and 30%, preferably between 1 and 10%.

The tubelet pocket is prepared from a suitable nonwoven fabric which is bonded on one side to a suitable woven or laid fabric of polyester, polyvinyl chloride or glass fibers, care being taken that the actual reinforcing action is supplied mainly by the threads running transversely of the finished pocket, while the longitudinal threads serve as an aid during this kind of bonding process. Therefore, considerably heavier threads can be used in the transverse direction than in the longitudinal direction. It is also possible to avoid the use of longitudinal threads if the transverse threads are directly worked into the nonwoven or are joined to the nonwoven by other known techniques.

Then two sheets of such a fabric are superimposed on one another, the reinforcing material preferably forming the outside, and they are stitched together with a many-needle sewing machine along straight lines in the longitudinal direction, at equal intervals. The web is cut into pieces of appropriate length. Then forming rods are inserted into the spaces between the seams and the nonwoven fabric is shrunk onto the rods at elevated temperature, whereupon the binding agent simultaneously condenses out, and the tubelet pocket is fixed in the desired shape, and receives the necessary strength.

The chief advantage of such a tubelet pocket is that their permanent expansion under working conditions can be limited to a value at which the active composition is available always in a loose state for high power yields, while the danger of sedimentation is prevented in a reliable manner.

DETAILED DESCRIPTION OF THE PREFERRED EMBODIMENTS

Figure 1:
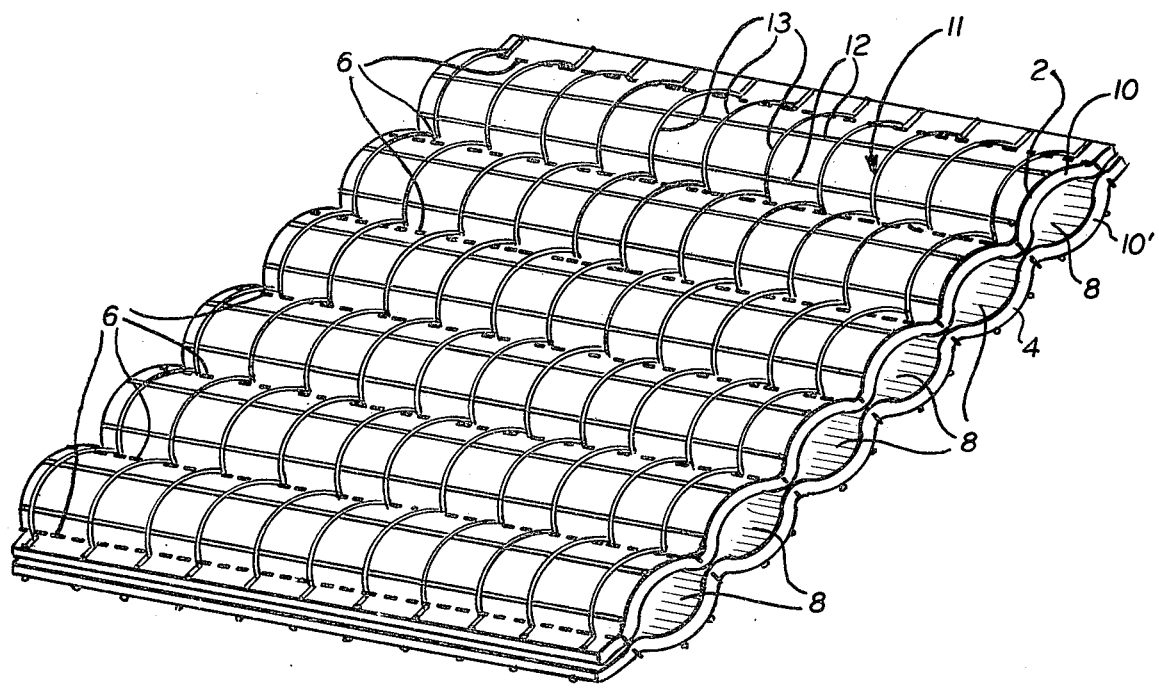
FIG. 1 is a perspective view of the tubelets of the present invention.

Referring to FIG. 1, the present invention comprises two pieces of a textile sheet material 2,4 which are held together by parallel seams 6 whereby the pocket is divided into tubelets 8 disposed parallel to one another. Each piece of textile sheet material consists of an electrolyte-resistant nonwoven fabric 10 which is reinforced by a woven or laid fabric 11 of electrolyte-resistant fibers 12,13.

Preferably the woven or laid fabric consists of monofil threads 12 and 13, the count of the warp threads being in a ratio to the filling threads of from 1 : 1 to 1 : 100, preferably of from 1 : 1 to 1 : 20. In the embodiment shown in FIG. 2, provision is made for using as the reinforcement only those threads 13 which run perpendicularly to the length of the tubelets.

The threads are disposed regularly at a distance from one another corresponding to a count of 0.5 to 5 threads per centimeter, preferably 1 to 3 threads per centimeter. The woven or laid fabric 11 of this kind can be joined to the textile sheet material such that the latter, under a load of 200 N per 5 centimeters of strip width, will have a permanent elongation of between 1 and 30%, preferably between 1 and 10%.

Figure 2:
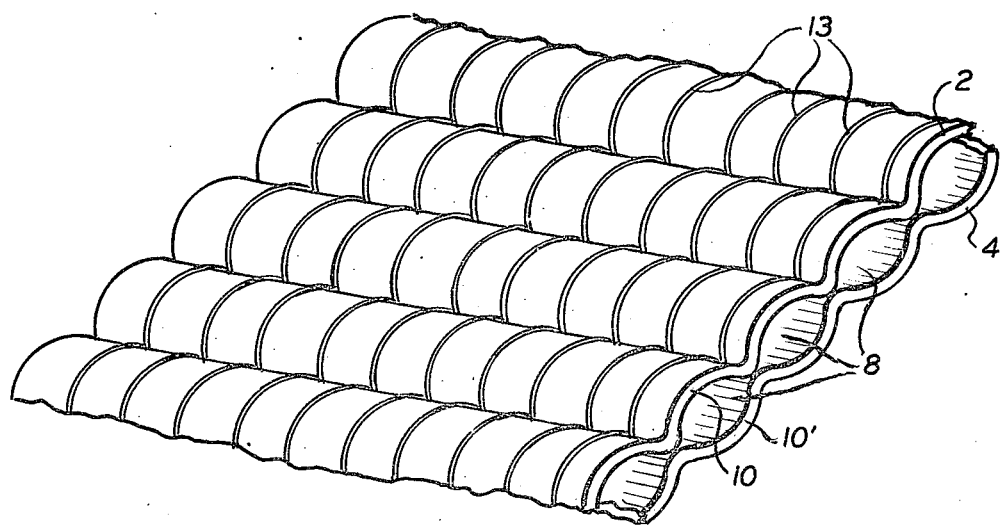
FIG. 2 is a partial view of the alternative embodiment of the invention.

The tubelet pocket 8 may be prepared from a suitable nonwoven fabric 10,10′ which is bonded on one side to a woven or laid fabric 11 of polyester, polyvinyl chloride or glass fibers, care being taken that the actual reinforcing action is supplied mainly by the threads running transversely of the finished pocket, while the longitudinal threads serve as an aid during this kind of bonding process. Therefore, considerably heavier threads 13 can be used in the transverse direction than threads 12 in the longitudinal direction. It is also possible to avoid the use of longitudinal threads 12, as shown in FIG. 2, if the transverse threads 13 are directly worked into the nonwoven or are joined to the nonwoven material 10 by other known techniques.

The method for making the tubelets is as follows:

The textile fabric 10 prepared in this manner is impregnated with a suitable binding agent and dried. Then two webs 10,10′ are superimposed on one another, the reinforcing material 11 preferably forming the outside, and they are stitched together with a many-needle sewing machine along straight lines 6 in the longitudinal direction, at equal intervals. The web is cut into pieces of appropriate length. Then forming rods (not shown) are inserted into the spaces between the seams and the nonwoven fabric is shrunk onto the rods at elevated temperatures, whereupon the binding agent simultaneously condenses out, and the tubelet pocket 8 is fixed in the desired shape, and receives the necessary strength.

The permanent expansion of the tubelets 8 under working conditions can be limited to a value at which the active composition is available always in a loose state for high power yields, while the danger of sedimentation is prevented in a reliable manner.

It will be appreciated that the instant specification and examples are set forth by way of illustration and not limitation, and that various modifications and changes may be made without departing from the spirit and scope of the present invention.

What is claimed is:

1. A tubelet pocket construction for holding the positive electrodes of accumulators, comprising two pieces of a stiffened textile sheet material connected together by parallel longitudinal seams, defining a plurality of parallel substantially cylindrical shape retaining tubelets, and wherein the textile sheet material comprises an electrolyte-resistant nonwoven fabric which is reinforced by a woven fabric of electrolyte-resistant fibers connected to only the outside surface of the nonwoven fabric and thereby is disposed only on the outer surface of the tubelets, said woven fabric being in the form of monofil threads.

2. The tubelet pocket construction of claim 1, characterized in that in the reinforcing fabric the count ratio of the warp threads to the filling threads being between 1 : 1 and 1 : 100.

3. The tubelet pocket construction of claim 2, wherein the count ratio of the warp threads to the filling threads is between 1 : 1 and 1 : 20, the reinforcing fabric has 1 to 3 threads per centimeter in at least one of the warp and filling directions and the textile sheet material has a permanent expansion between 1 and 10%.

4. The tubelet pocket construction of claim 3, wherein the reinforcing fabric is woven onto the sheet material.

5. The tubelet pocket construction of claim 3, wherein the reinforcing fabric is bonded onto the sheet material.

6. The tubelet pocket construction of claim 1, characterized in that the reinforcing is provided only by threads running perpendicular to the tubelet direction.

7. The tubelet pocket of construction claim 1 characterized in that the reinforcing fabric has 0.5 to 5 threads per centimeter, in at least one of the warp or filling directions.

8. The tubelet pocket construction of claim 1 characterized in that the textile sheet material used has a permanent expansion between 1 and 30%, upon a repeated loading of 200 N/5 cm strip width.

* * * * *